D. H. AND A. G. BEYEA.
SALT CAKE.
APPLICATION FILED NOV. 22, 1918.

1,372,590.

Patented Mar. 22, 1921.

INVENTORS:
David H. Beyea and Albert G. Beyea,
BY
Fraser, Dark + Myers
ATTORNEYS.

UNITED STATES PATENT OFFICE.

DAVID H. BEYEA AND ALBERT G. BEYEA, OF UNION SPRINGS, NEW YORK.

SALT CAKE.

1,372,590.                  Specification of Letters Patent.        Patented Mar. 22, 1921.

Application filed November 22, 1918. Serial No. 263,758.

*To all whom it may concern:*

Be it known that we, DAVID H. BEYEA and ALBERT G. BEYEA, both residents of Union Springs, in the county of Cayuga and State of New York, have invented certain new and useful Improvements in Salt Cakes, of which the following is a specification.

This invention relates to salt cakes for use in salting cattle or horses. For this purpose cakes of compressed salt are placed in a suitable holder fastened against the wall of a stable, in such position that the animals can lick the exposed bottom end of the cake, which gradually descends in the holder as it is consumed. The invention particularly refers to cakes of substantially cylindrical form held in an upright holder, such as that set forth in United States Patent to David H. Beyea, No. 797,167, dated August 15, 1905.

The nature of the invention will be made apparent as the description proceeds.

In the accompanying drawing,—

Figure 1:
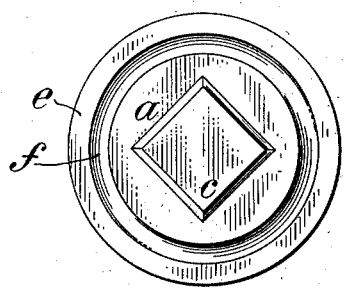
Figure 4:
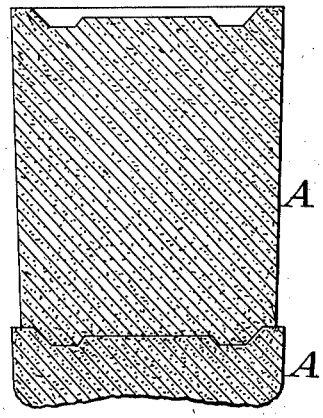
Figure 2:
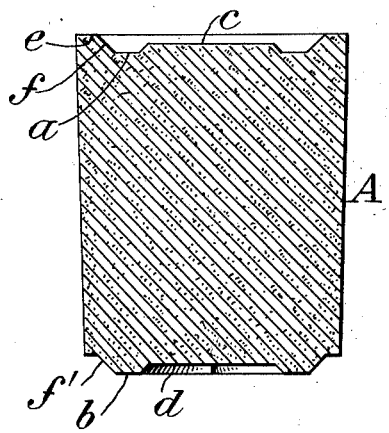
Figure 3:
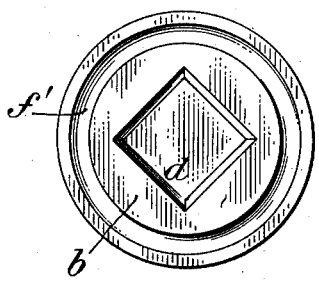

Figure 1 is a top view,

Fig. 2 a vertical diametrical section, and Fig. 3 a bottom view, of a cake of salt according to the present invention;

Fig. 4 is a vertical section showing two such cakes after being cemented together, and the lower one mainly consumed.

The cake A shown in Figs. 1, 2 and 3, may be formed in any suitable way, as, for example, by pressure in a mold in a suitable press, being for this purpose preferably somewhat tapered or frusto-conical. Such cakes as heretofore made have been cylindrical or approximately so, and have been flat on top and rounded on the bottom. According to the present invention, the opposite ends of the cake are formed with corresponding projections and depressions, so that when two such cakes are fitted together end to end, they will closely interfit.

When salt cakes are used in the manner set forth in said patent, the cake keeps descending in the holder as it is consumed, until a small piece remains, which eventually is insufficiently supported and falls out, and often is lost and wasted. The present invention aims to avoid such waste by affording means for cementing together the successive cakes so that the remnant of a preceding cake will be upheld by its union with the succeeding cake above, so that all portions of the salt are consumed without waste.

The preferred embodiment of the invention is that shown, wherein the top of the cake has a circular depression $a$, and the bottom of the cake a projection $b$ of like contour, so that the two may interfit. These are shown as constituting a circular or rotatable engagement. In addition, the top of the cake is shown as having a projection $c$ of polygonal form, and the bottom of the cake as having a depression $d$ of like polygonal form, adapted to interfit the projection $c$. The outer rim $e$ surrounding the upper depression $a$ extends higher than the projection $c$, so as to form a sort of concave top or modified saucer-shaped concavity adapted to hold a small quantity of water. Preferably, the junction of the flange $b$ with the depression $a$ is effected through a cone or flaring portion $f$, and on the bottom a similar cone portion $f'$ is provided. All these respective parts are adapted to closely interfit, so that the bottom of one cake and the top of the next may be joined intimately together.

By means of this invention the mere placing of a new cake on the top of a partly consumed one causes the two to so closely engage that, by simply being left in contact they will under most atmospheric conditions, become sufficiently cemented together for the purpose of this invention. But in particularly arid sections, or when the weather is especially dry, or in any case when it is desired to insure their cementation, it is desirable to apply a small quantity of water, perhaps a teaspoonful or more, on top of the lower cake before superimposing thereon the upper cake. This causes a partial dissolving of the surfaces of both cakes, and as the water dries out, the cakes become so cemented together as to be nearly homogeneous.

The precise nature of the interfitting projections and depressions is not essential to the invention in its broadest aspect, it being obvious that the shape, size, depth, and other dimensions of these, may be subject to considerable variation.

The invention is not limited to cylindrical cakes which are adapted to turn in the holder under the action of an animal's tongue in licking therefrom. As applied to such rotative cakes, the polygonal projections and depressions insure the transmission of such rotative movements from a lower cake to the one superposed upon it. For this purpose any non-circular interfitting projection and depression would be the equivalent of the form shown.

We claim as our invention:—

1. A salt cake having its opposite ends formed with reciprocal projections and depressions, adapted, when two like cakes are superposed, to interfit, the depression being on the end which in use is the top, and adapted to hold a small quantity of water, so that the interfitting end of the superposed cake may become cemented thereto.

2. A cake according to claim 1, the projections and depressions having inter-engaging portions of circular outline.

3. A cake according to claim 1, of substantially cylindrical form, the interfitting projections and depressions having engaging portions mutually adapted to resist relative rotation whereby a lower cake may communicate rotation to a superposed cake.

In witness whereof, we have hereunto signed our names.

DAVID H. BEYEA.
ALBERT G. BEYEA.